(12) United States Patent
Shu et al.

(10) Patent No.: US 8,369,565 B2
(45) Date of Patent: Feb. 5, 2013

(54) INFORMATION HIDING WITH SIMILAR STRUCTURES

(75) Inventors: Yu-Chen Shu, Jhonghe (TW); Wen-Liang Hwang, Kaohsiung (TW)

(73) Assignee: Academia Sinica, Taipei (TW)

(*) Notice: Subject to any disclaimer, the term of this patent is extended or adjusted under 35 U.S.C. 154(b) by 476 days.

(21) Appl. No.: 12/765,189

(22) Filed: Apr. 22, 2010

(65) Prior Publication Data

US 2010/0272312 A1    Oct. 28, 2010

Related U.S. Application Data

(60) Provisional application No. 61/172,395, filed on Apr. 24, 2009.

(51) Int. Cl.
*G06K 9/62* (2006.01)
(52) U.S. Cl. ........................................ 382/100
(58) Field of Classification Search ............... None
See application file for complete search history.

(56) References Cited

U.S. PATENT DOCUMENTS 5,721,788 A * 2/1998 Powell et al. ............... 382/100

OTHER PUBLICATIONS

A. Barg et al., "Digital fingerprinting codes: problem statements, constructions, identification of traitors", *IEEE Trans. on Information Theory*, vol. 49, No. 4, pp. 852-865, (2003).
Boneh, D. and J. Shaw, "Collusion-secure fingerprinting for digital data", *IEEE Trans. on Information Theory*, vol. 44, No. 5, pp. 1897-1905, (1998).
S. Craver, "Zero knowledge watermark detection," *Proc. 3rd Int. Workshop on Information Hiding*, vol. 1768, Spring 2000, pp. 101-116. Lecture Notes in Computer Science.
I. Cox et al., "Secure spread spectrum watermarking for multimedia", *IEEE Trans. on Image Processing*, vol. 6, No. 12, pp. 1673-1687, (1997).
I. Cox et al., "Watermarking as communications with side information", *Proceedings of the IEEE*, vol. 87, No. 7, pp. 1127-1141 (1999).
Furon, T. and P. Duhamel, "An asymmetric watermarking method", *IEEE Trans. on Signal Processing*, vol. 51, No. 4, pp. 981-995, (2003).
Hartung, F. and B. Girod, "Watermarking of uncompressed and compressed video", *Signal Processing*, vol. 66, No. 3, pp. 283-301, (1998).
S. Katzenbeisser and F. A. Petitcolas, "Information hiding techniques for steganography and digital image watermarking", *Artech House*, MA. U.S.A., (2000).
A. Kerckhoffs, "Lacryptographic militaire", *J. Sci. Militaires*, vol. 9, pp. 5-38, Jan. (1883).
Moulin, P. and J. A. A. O'Sullivan, "Information-theoretic analysis of information hiding", *IEEE Trans. on Information Theory*, vol. 49, No. 3, pp. 563-593, (2003).
G. Peters et al., "How to measure the pose reobustness of object views", *Image and Vision Computing*, vol. 20, pp. 249-256, (2002).
F. A. P. Petitcolas et al. "Information hiding—a survey", *Proceedings of the IEEE (Special issue on protection of multimedia content)*, vo. 87, No. 7. pp. 1062-1078, (1999).

(Continued)

*Primary Examiner* — Atiba O Fitzpatrick
*Assistant Examiner* — Thomas A James
(74) *Attorney, Agent, or Firm* — Occhiuti Rohlicek & Tsao LLP

(57) ABSTRACT

In some aspects, message data is generated from a first representation of a message and a reference image. The message data is generated to hide the message such that generating a second representation of the message from the message data requires processing of a second image that is perceptually similar to the first image. In some examples, a degree to which the second representation of the message is perceptually similar to the first representation of the message is related to a degree to which the second image is perceptually similar to the first image.

20 Claims, 7 Drawing Sheets

OTHER PUBLICATIONS

J. Tzeng et al., "Enhancing image watermarking methods with/without reference images by optimization on second order statistics", *IEEE Trans. on Image Processing*, vol. 11, pp. 771-782, (2002).

W. Trappe et al., "Anti-Collusion fingerprinting for multimedia", *IEEE Trans. on Signal Processing*, vol. 51, No. 4, pp. 1069-1087, (2003).

J. Tzeng et al., "An Asymmetric subspace watermarking method for copyright protection", *IEEE Trans. on Signal Processing*, vol. 53, No. 2, pp. 784-792,.( 2005).

S. Voloshynovskiy et al., "A stochastic approach to content adaptive digital image watermarking", *Proc. 3rd Int. workshop on Information Hiding*, Dresden,Germany, Sep. 1999, pp. 211-236.

\* cited by examiner

A B

A B C D

E F

A

B

C

D

INFORMATION HIDING WITH SIMILAR STRUCTURES

CROSS-REFERENCE TO RELATED APPLICATIONS

This application claims the benefit of U.S. Provisional Application No. 61/172,395, filed on Apr. 24, 2009, the contents of which are incorporated herein by reference.

BACKGROUND

This document relates to information hiding.

Secure communication can be defined as a means of information sharing between two parties, where no third party is aware of the communication or the information exchanged. Information about a secure communication ranges from the content of the message and the communicating parties to the fact that a communication took place. In some past approaches, the security of content information was ensured by using encryption. However, since ciphering can arouse suspicion, information hiding techniques that embed messages in cover-text to produce stego-text are now widely used. Because of the emergence of digital copyright protection techniques, information hiding schemes have also received a great deal of attention in the last decade. In particular, watermarking, which tries to protect copyright ownership, and fingerprinting, which is used to identify copyright violators, have been well studied. Criteria used to assess information hiding techniques include robustness, security, and capacity. Robustness is the resistance of the embedded message to modification or erasure in the stego-text. For instance, the criterion requires an information hiding system to be robust against common signal processing and geometrical distortion algorithms. The objective of this security constraint is to prevent a malicious user who knows the system from discovering loopholes in it. The long-held wisdom in the field of security is summarized by Kerckhoff's principle, which advocates that security cannot rely on the assumption that an opponent is unfamiliar with the system. Rather, it must be assumed that the opponent knows the system except for a few keys or parameters. The capacity criterion refers to the amount of information that can be embedded in the cover-text.

Referring to FIG. 5, a conventional paradigm of information hiding can be described as follows. Let us assume that Alice wants to send a secret message m to Bob. Alice uses a secret encoding key to embed the message in the cover-text X and obtain the stego-text $\tilde{X}$, which is then published. A decoding key, which Bob will use to open $\tilde{X}$ and retrieve the message m, is then derived. The key can be published or transmitted secretly to Bob. If it is publicly available, then the scheme is defined as asymmetric watermarking, which means that the encoding key is private and the decoding key is a publicly available. Otherwise, the scheme is defined as watermarking, which indicates that both the encoding and decoding keys are secret. Note that in asymmetric watermarking, the decoding keys are usually content-dependent and managed by a trustworthy third party in order to maintain their integrity. Because the secret message is implanted in the cover-text, the latter is modified, which is a side-effect of using the conventional paradigm for hiding information.

SUMMARY

In one aspect, in general, a feature of an information hiding paradigm that is described in this document is that the message to be sent secretly is not embedded in the cover-text; hence, in contrast to the conventional paradigm, the cover-text is not modified under the paradigm. An advantage is that Bob does not require Alice's stego-text to extract the secret information, as he can produce his own stego-text. The paradigm can be operated in two different modes: the S-mode and the P-mode. In the S-mode, Alice's cover-text is kept secret, whereas in the P-mode, the cover-text is publicly available. As shown in FIG. 3, in the S-mode, Alice uses the secret cover-text X and the message m to generate the decoding keys, k and D. D is a public key, while k can be either public or private. From (k, D), and a picture that is perceptually "similar to" (as defined later in this document) the cover-text, Bob can derive the message m. The fact that Bob can use any picture that is perceptually similar to the cover-text implies that he only needs to know the method to obtain the cover-text from Alice. For example, Alice may use any picture on the Internet as the cover-text and give Bob the link to the picture. Alternatively, she may use a picture in a database that Bob also uses, or Bob can take a photograph after learning where and under what conditions to take the picture. Note that, in the last case, even though a third party may know the location of the cover-text, he may not be able to obtain a picture; for example, if the cover-text is a picture taken in the White House. FIG. 4 illustrates the operation of the P-mode in which the cover-text is publicly available, but the k key is private. The proposed paradigm satisfies Kerckhoff's principle, since the security is based on the cover information in the system that is not published.

In transmitting secret information without modifying the cover-text, the cover-text can be regarded as a 'functional' object. Alice calls the functional object by using the message as the passing argument, which generates the decoding keys that Bob uses as arguments to call the functional object. The function then returns Alice's secret message. Under the described paradigm, at both Alice's site and Bob's site, the cover-text behaves just like a function that takes input arguments and outputs the results. The function's body is not modified. Regarding the cover-text as a function differentiates the described paradigm, referred to as the functional style of information hiding, from the conventional information hiding approach in which the cover-text cannot be regarded as a functional object because it is modified by the message.

In another aspect, in general, message data is generated from a first representation of a message and a first image. The message data is generated such that generating a second representation of the message from the message data requires processing of a second image that is perceptually similar to the first image, for instance, without requiring that the second image is the same as the first image. The second image is independent of the message, for example, not requiring modification of the image according to the message.

In some examples, the second image may deviate significantly from the first image in certain characteristics while remaining perceptually similar to the first image. For instance, the first image and the second image may result from independent acquisitions of images of a same physical scene or object (e.g., a specific building or face, etc.) made at different times and/or from different perspectives.

Aspects may include one or more of the following features.

The message data is conveyed a recipient.

A second representation of the message is generated from the message data by processing a second image that is perceptually similar to the first image according to the message data.

Information is conveyed to the recipient identifying the second image.

The second image is obtained independently of the first image.

The first and/or second representation of the message includes an image, an audio signal (e.g., music), or a video signal.

The first image is selected independently of the message.

Generating the message data includes forming a set of transformations of the first image, each transformation being perceptually similar to the first image. Generating the message data may also include forming a set of transformations of the first representation of the message, each transformation being substantially perceptually similar to said first representation.

Generating the message data includes generating first message data specifying a transformation function for application to the first image and to the second image, and generating second message data representing a difference between the first representation of the message and an application of the transformation function to the first image.

A second representation of the message is generated from the message data by applying the transformation function specified by the first message data to a second image that is perceptually similar to the first image and using the second message data in combination with a result of applying the transformation function to yield the second representation of the message.

In another aspect, in general, characteristics of a first image across a number of transformations of the first image are determined. The transformations are selected such that each transformation applied to the first image creates a transformed image that is perceptually invariant from the first image. Message data is created from a first representation of a message and the determined characteristics of the first image such that the message data in combination with a second image perceptually invariant from the first image is sufficient to form a second representation of the message.

In another aspect, in general, a method for concealing a message includes applying a set of transformations to a first image to produce a set of transformed image, and calculating a first feature representation of each of the transformed images. A set of transformations is also applied to a first message to produce a set of transformed messages, and a second feature representation is calculated for each of the transformed messages. A transformation from a first feature representation of an image to a second feature representation of a message is determined, and message data is formed according to the first image, the first message, and determined transformation.

Determining the characteristics of the first image may include identifying a subspace of a feature space of a feature transformation applied to the image. The identified subspace of the feature space may exhibit relatively less variability over the plurality of transformations of the first image than the complement of the subspace.

In another aspect, in general, a method for decoding hidden information includes accepting message data. The message data include first message data specifying a transformation function for application to an image and second message data representing a difference between a first representation of the message and an application of the transformation function to the first reference image. A second reference image is accepted, and a second representation of the message is formed from the message data by applying the transformation function specified by the first message data to the second reference image and using the second message data in combination with a result of applying the transformation function to yield the second representation of the message.

In another aspect, in general, a system for concealing a message includes an encoder. The encoder includes an input interface for accepting a first representation of a message. The encoder includes a first analyzer for processing a first reference image, and a second analyzer for processing a representation of a message accepted through the interface. The encoder further includes a module for combining a product of the first analyzer and a product of the second analyzer to form message data, and an output interface to providing the message data.

Generating a second representation of the message may require processing of a second reference image that is perceptually similar to the first reference image without requiring that the second image depends on the message.

The system may further include a decoder communicatively coupled to the encoder. The decoder includes an input interface for accepting the message data, and a image analysis module for forming an analysis of a second reference image. The decoder further includes a module for combining the analysis of the second reference image and the message data to form a second representation of the message, and an output interface for providing the second representation of the message.

The encoder may be configured such that when the second reference image is perceptually similar to the first reference image, the second representation of the message is also perceptually similar to the first representation of the message.

Aspects may have one or more of the following advantages.

An information hiding approach can make use of information in an image without requiring modification of the image to hide the information.

The image used for decoding the hidden information does not have to be an exact copy of the image used to hide the information, and can represent a significant modification that nevertheless maintains a perceptual similarity.

Other features and advantages of the invention are apparent from the following description, and from the claims.

DESCRIPTION

1 Overview

Figure 1:
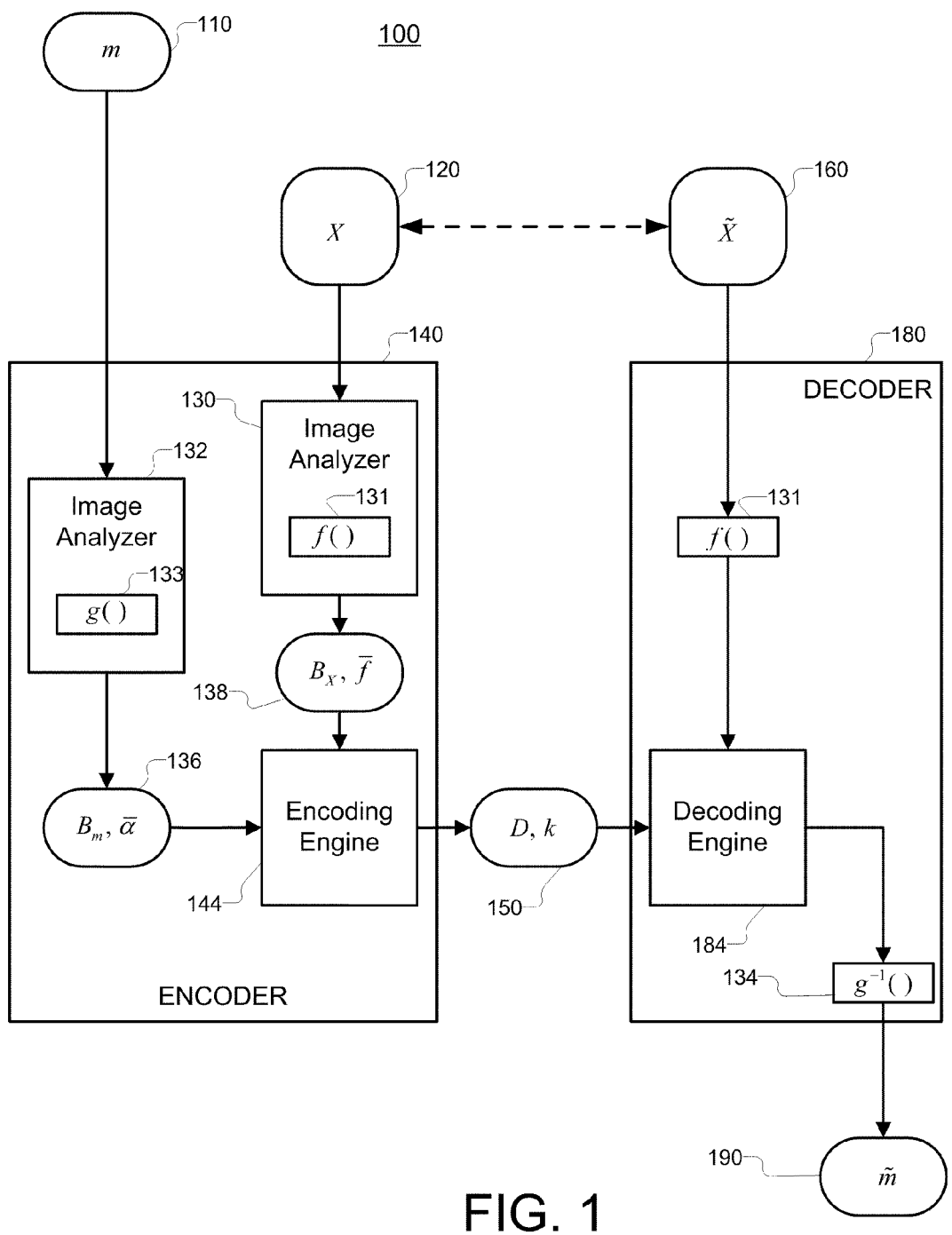
FIG. 1 is a system block diagram.

Referring to FIG. 1, an example of an information hiding system 100 is used to encode a message m 110 produce a hidden message 150. A decoder 180 processes the hidden message 150 to produce a decoded message m̂ 190, which is not necessarily identical to m, but that is sufficiently similar to communicate information in the message. For example, the information hiding system is used for secure and hidden communication and/or storage of the message. The approach makes use of an encoding reference image X 120, which is known to the encoder 140, and which generally serves a function of "cover text" for the message. The decoder 180 makes use of another image, referred to as the decoding reference image, which does not necessarily have to be an exact copy of the encoding reference image. When the decoding reference image X̃ 160 used by the decoder is similar to the encoding reference image X 120 used by the encoder, the decoder uses this similar image to produce the decoded message m̂ 190, which is similar to m. In some examples, the degree to which the decoded message is similar to the original message is related to the degree to which the reference image used by the decoder is similar to the reference image used by the encoder. In some examples, the message is also an image, for example, an image representation of a text message. In general, both the hidden message 150 and knowledge of the reference image 120 (or knowledge of how to obtain a suitable decoder deference image 160) are needed to decoder the hidden message to form a decoded message that carries the information represented in the original message m.

The encoder 140 accepts data representing the message m 110 and data representing the reference image X 120, and processes these data using respective image analysis modules 132 and 130. The image analysis of the reference image makes use of a feature analysis function $f(\ )$ 131. Similarly, the image analysis of the message makes use of a feature analysis function $g(\ )$ 133, which is not necessarily the same as the feature analysis function for the reference image. As an example, the feature analysis function may provide a vector of Discrete Cosine Transform (DCT) or Wavelet Transform coefficients of the image.

Generally, the image analysis 130 of the reference image produces a reference image analysis $(B_X, \bar{f})$ 138 in which $B_X$ represents a subspace of the analysis feature space (i.e., of the vector space that forms the domain of the reference feature analysis function) in which feature vectors are relatively invariant to transformations of the reference image that are perceptually invariant (or similar). The second term, $\bar{f}$, represents a mean feature vector that is produced by applying the feature analysis function to images that are similar to X. Similarly, the image analysis 132 of the message produces a reference image analysis $(B_m, \bar{\alpha})$ 136 in which $B_m$ represents a subspace of the feature space in which feature vectors are relatively invariant to transformations of the message that are perceptually invariant (or similar). The second term, $\bar{\alpha}$, represents a mean feature vector that is produced by applying the feature analysis function to messages that are similar to m.

The encoder includes an encoding engine 144, which uses the message image analysis 136 and reference image analysis 138 to produce the hidden message (D,k) 150. Generally, D defines a transformation from the reference image analysis feature space to the message analysis feature space, and k encodes the analysis features of the message relative to a transformation of analysis features of the reference image. As detailed below in Section 3 below, D is generally chosen such that the most invariant dimensions of the feature analysis space of the reference image are used to reconstruct the most invariant dimensions of the feature analysis space of the message.

Figure 2:
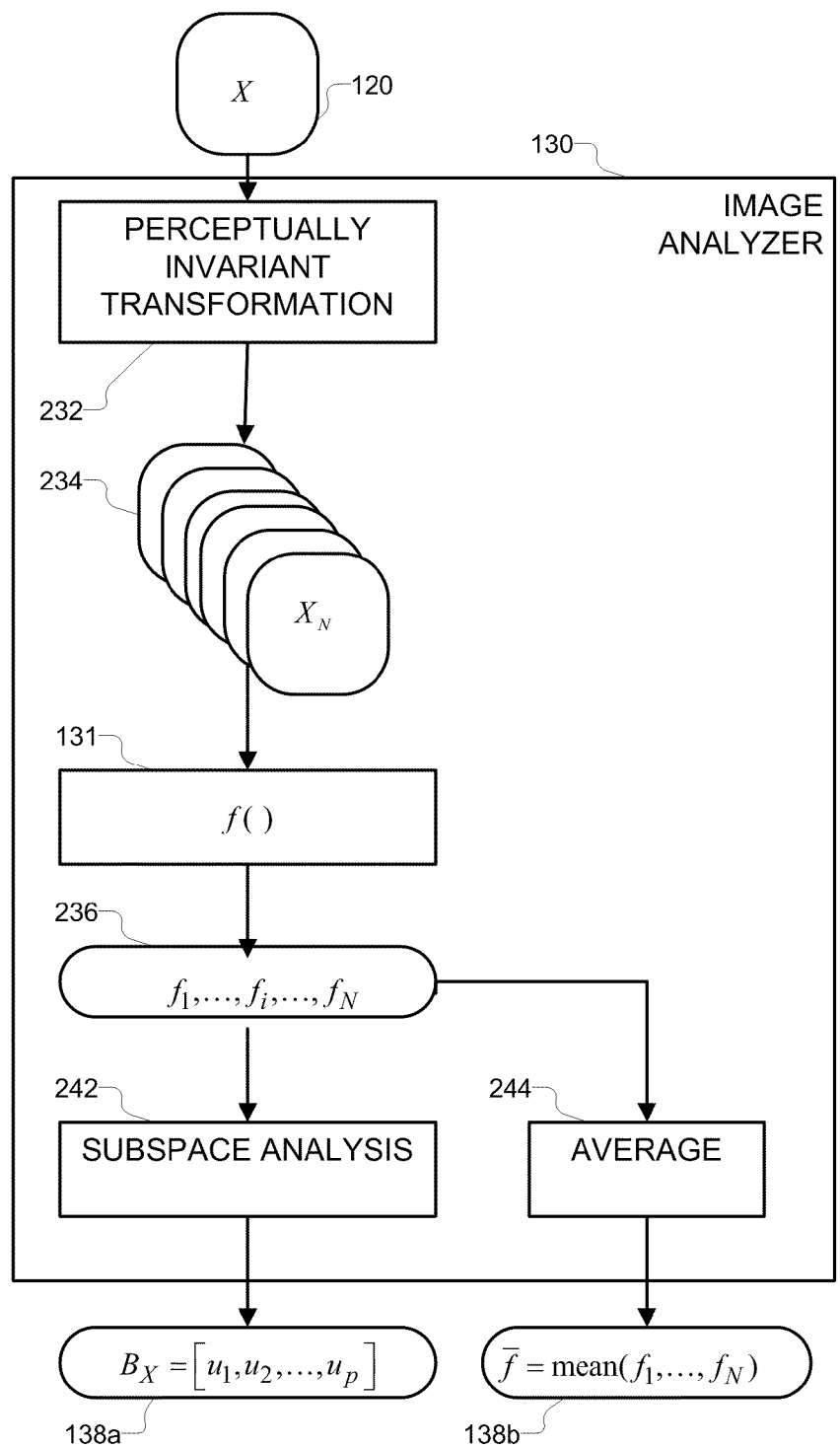
FIG. 2 is a block diagram of an image analyzer.

Referring to FIG. 2, the image analyzer 130 for the reference image makes use of a perceptually invariant transformation module 232, which takes as input the reference image X 120, and produces a set of N transformed images $X_{i\ 234}$ each transformed image being produced by applying a different image transformation to the original reference image. The image transformations are chosen such that each produces a transformed image that is perceptually equivalent to the original image. For example, the image transformations may include geometric distortions and/or basic signal processing of the reference image. Each of the transformed images is analyzed with the feature analysis function $f(\ )$ to produce a corresponding feature vector. A subspace analysis module 242 is applied to the set of feature vectors 236 to produce the basis matrix $B_X$ 138a, which represents a p-dimensional subspace of the full feature analysis space for the reference image. This subspace is chosen to be relatively invariant over the set of transformed images according to a procedure described in detail in Section 3 below. An average module 244 is also applied to the set of feature vectors 236 to produce a mean $\bar{f}$ 138b of the feature vectors.

In some example, the image analyzer 132 for the message has the same structure as the image analyzer 130 for the reference image, with the feature analysis function $g(\ )$ 133 used in place of $f(\ )$ 131. Although the dimensions of the feature analysis of the reference image and the message may differ, the subspace analysis provides a basis matrix for a p-dimensional subspace in both cases.

Referring again to FIG. 1, the encoding engine 144 of the encoder 140 combines the two basis matrices, $B_X$ and $B_m$, to form the transformation matrix $D=B_m L B_X^t$, where L is chosen to be a diagonal matrix. The transformation matrix is then used to determine $k=D\bar{f}-\bar{\alpha}$, which is a vector that generally represents a difference between the mean analysis features determined from the message ($\bar{\alpha}$) and a mapping (i.e., multiplication by D) of the average features determined from the reference image ($\bar{f}$) to the message analysis feature space.

The decoding engine 184 of the decoder 180 applies a features analysis to the similar reference image ($\tilde{X}$) to produce an analysis feature vector $\tilde{f}=f(\tilde{X})$. Generally, the feature vector $\tilde{f}$ is expected to be similar to $\bar{f}$ in the subspace identified in the subspace analysis 242 of the encoder. The decoder then forms a message analysis feature vector $\tilde{\alpha}=D\tilde{f}-k$, which is expected to be similar to $\bar{\alpha}$ in the dimensions indentified in the subspace analysis for the message. Finally, the decoder applies the inverse analysis function 134 to yield the decoded message $\hat{m}=g^{-1}(\tilde{\alpha})$ 190.

2 Examples

Figure 3:
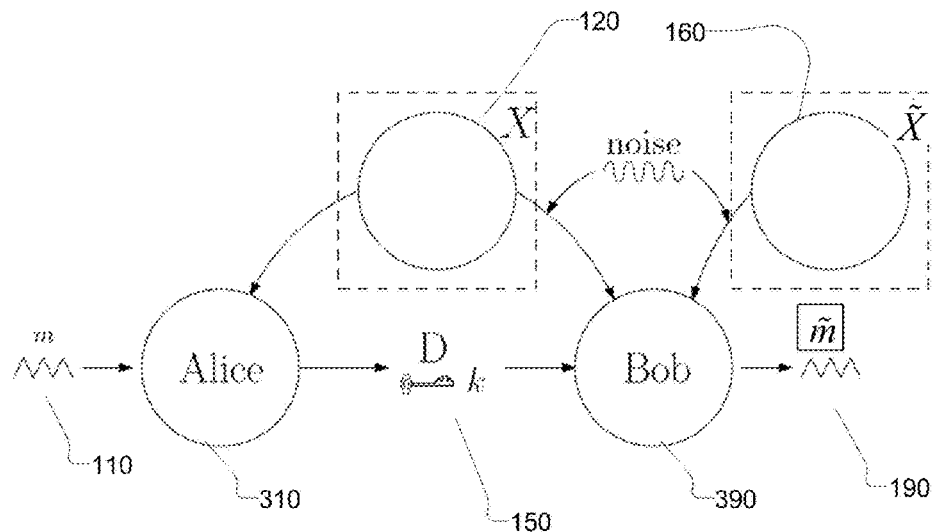
FIG. 3 is a diagram that illustrates a first exemplary use of information hiding.

Referring to FIG. 3, in an exemplary use of one mode of the information hiding system described above, a user Alice 390 seeks to send a message m 110 to a second user Bob 390. Alice uses the cover text X to produce the keys (D,k) 150, which are transmitted to Bob. In this example, the cover text X 120 is not modified by Alice (or Bob). Bob makes use of the received keys and an image X̃ 160 that is perceptually similar to X to extract the message m̂ 190. The extracted message is similar to the original message m 110 and therefore conveys the desired information in the message from Alice to Bob. Note that in this mode, the cover text X (i.e., the cover text itself or information that would identify the cover text) and its perceptually similar versions are kept secret so that other parties cannot use the keys to reconstruct the hidden message.

Note that some shared information about the reference image is needed by both the encoder 140 and the decoder 180. However, transmission of the image from the encoder to the decoder is not needed. For example, the encoder and the decoder may share knowledge of how to obtain the respective reference images, for example, using agreed upon images stored on the Internet, or repeated photographs of agreed upon scenes. The shared knowledge may, for example, be pre-arranged before the message is available or communicated in another manner (e.g., on a side channel) than the hidden message 150.

In some examples, the reference image is selected independently of the message, for example, before the message is known. In some examples, the image analysis of the reference image can be precomputed with the reference image analysis 138 being stored for later use. In some examples, both the message and the reference image are processed at the time of encoding of the message.

Figure 4:
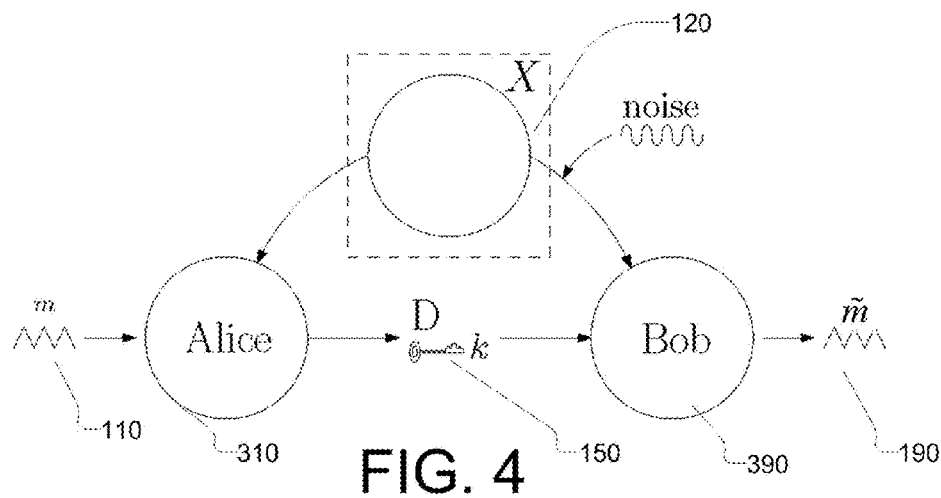
FIG. 4 is a diagram that illustrates a second exemplary use of information hiding.
Figure 5:
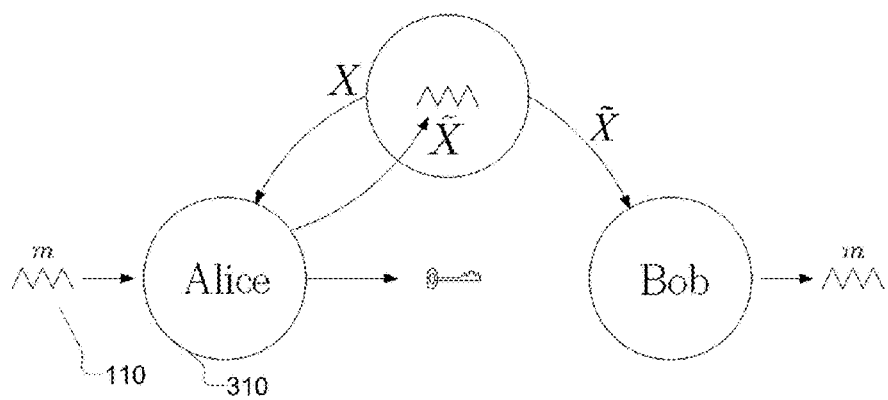
FIG. 5 is a diagram that illustrates a conventional approach to information hiding.

Referring to FIG. 4, in some examples, the hidden message 150 is posted to a publicly available location and the sender randomly selects X. The sender provides a reference to X (or a possibly version of X) to the receiver. The receiver then retrieves the publicly available encrypted message and reconstructs the message. In some examples, the hidden message 150 is concealed in the publicly available location by stegonographic means and only the intended receiver knows the location or is even aware that the hidden message is present at the location.

In some examples, the encoder and decoder are configured so that they use the same analysis functions. In some embodiments, information needed to configure the analysis functions at the decoder is provided along with the hidden message.

In some examples, the hidden message is not necessarily transmitted. A user processes a message 110 using encoder 140 and reference image 120 and the user stores the resulting hidden message 150. The user can then destroy the reference image 120. The user later creates the reference image 160 based on his or her memory of the initial reference image 120. The user decodes the stored hidden message 150 using decoder 180 and reference image 160. In one example of this embodiment, the reference images are photographs of a location accessible to the user.

In examples described above, the image analyzers 130 and 132 make use of repeated transformations of the reference image and the message, respectively. In other examples, the functions of one or both of the analyzers do not require such repeated transformations, for example, making use of analytic techniques. Furthermore, the message is not necessarily required to be represented as an image with a suitably defined message analysis function.

The approach described above is not limited to messages and/or references being images. For example, a message m or image X may be another type of signal, including audio (e.g., music or voice recording) or video. For each type of message signal, an appropriate analysis function g( ) 133 and its inverse $g^{-1}$( ) 134 are defined, and appropriate perceptually invariant transformations of the message are generated as part of the message analysis step that yield ($B_m, \bar{\alpha}$).

3 Subspace Approach

As introduced above, in some examples, mapping of features of a message is based on an identification of a set of features of an image that are robust to perceptually invariant transformations of the image. One approach to identification of such features is identification of a subspace of a larger feature space such that the identified subspace shows a lower degree of variation over a range of transformations than in the complement of that subspace.

We begin by characterizing an image S that is perceptually similar to an image X. As there does not exist a modeling of S and enumerating the elements in S would be impossible, we sample images S that are perceptually similar and derive sample statistics that permit characterization of the class of such images. Sampling is carried out on images obtained by applying perceptually invariant operations on X. The operations modify X, but retain the property that ensures the resultant images are perceptually similar to or indistinguishable from X. In some examples, the operations are composed of basic signal processing or geometrical distortion algorithms. Usually, as many images as practically possible are generated so that the sampling statistics are close to the real statistics of S. The subspace approach is one way to characterize S from sampled images. In other examples, the sampling may be achieved by other means, for example, by repeated acquisitions of an image of a same object, for example, from different perspectives, different backgrounds, or at different times.

Let $X_i \sim X$ with $i=1, \ldots, N$ be a sequence of images that are similar to X, in this example, obtained by modifying X with perceptually invariant operations. A goal of one or more of the information hiding approaches described in this document is that Bob should be able to extract Alice's message from any image in the sequence, for from yet a different image that is chosen from a larger set that is characterized by the set of N images.

For each of the N images, a feature $f_i = f(X_i)$ are obtained. For example, the feature can be an n-dimensional vector of a subset of the discrete Fourier transform or the wavelet transform of an image. Other features can be used, for example, that makes use of signal processing that provides some degree of robustness over the range of image acquisition situations (e.g., lighting, cropping, rotation, etc.)

For an image feature vector of dimension n, which is usually smaller than N, and average (mean) feature vector is defined as $\bar{f} = (1/N)\Sigma_{i=1}^{N} f_i$. A feature vector direction u, where u has unit length, is defined to be affected less than a cut-off threshold $\epsilon$ if it satisfies $|u^t(f_i - \bar{f})| \leq \epsilon$ for all image feature vectors $f_i$. These less affected vectors span a subspace. This subspace can be found by applying the singular value decomposition of $$F - \bar{F},$$

where $$F_{n \times N} = [f_1, f_2, \ldots, f_N] \text{ and}$$

$$\bar{F}_{n \times N} = [\bar{f}_1, \bar{f}_2, \ldots, \bar{f}_N].$$

Let the singular value decomposition take the form $$F - \bar{F} = U \Lambda V^t,$$

where $$U_{n \times n} = [u_1, u_2, \ldots, u_n] \text{ and}$$

$$V_{N \times N} = [v_1, v_2, \ldots, v_N]$$

are unitary matrices, and $\Lambda_{n \times N}$ is a diagonal matrix with $\lambda_i = \Lambda_{i,i}$ for $1 \leq i \leq n$. Then, we have $$u_j^t (F - \bar{F}) = u_j^t U \Lambda V^t = \lambda_j v_j^t.$$

If $\lambda_j \leq \epsilon$ then $u_j$ can be taken as the less-affected vector because $\|\lambda_j v_j^t\|_\infty \leq \lambda_j$. Suppose the dimension of the less-affected subspace is p. Without lost of generality, we assume that $u_1, u_2, \ldots, u_p$ are the less-affected vectors. The basis matrix of the less-affected subspace of X is then $$B_X=[u_1, u_2, \ldots, u_p]_{n \times p}.$$

Let us assume that the message m is an image. We can obtain the less-affected subspace of m by following the procedure used to find that of X. The p×p basis matrix of m is denoted by $B_m=[w_1, w_2, \ldots, w_p]_{p \times 92}$.

The keys D and k are constructed as follows:

$$D=B_m L B_X^t$$

where L is a p×p diagonal matrix with entries $l_1, l_2, \ldots, l_p$, and $$k=D\bar{f}-\bar{\alpha}$$

where $\bar{\alpha}$ is the average of the feature $\alpha_i=g(m_i)$ of the message $m_i$ for all i. Each message is obtained by modifying m with perceptually invariant operations. The image reconstructed from the mean feature $\bar{\alpha}$ is perceptually "similar to" the message m:

$$g^{-1}(\bar{\alpha}) \sim m$$

where $g^{-1}( )$ is the inverse function of the feature-extraction function $g( )$ Bob takes any image Z and the keys D and k to recover the message $g^{-1}(Df(Z)-k)$. The message extraction procedure is denoted as $$Bob: Z, D, k \rightarrow g^{-1}(Df(Z)-k).$$

4 Results

Figure 6:
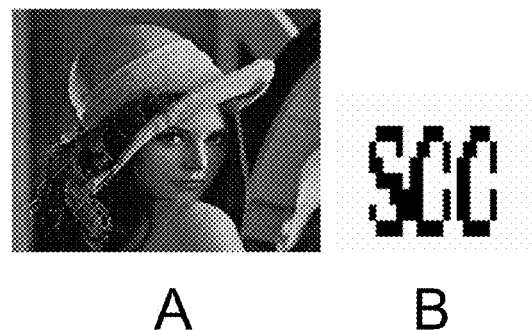
FIG. 6A is a reference image and FIG. 6B is an image representation of a message.

Experimental results using an approach described above and features of the lowest 32×32 frequency components (i.e., feature vectors $f$ of dimension n=1024) of the Discrete Cosine Transform (DCT) of the image. The basis matrix $B_X$ of the less-affected subspace of X is formed by the eigenvectors with the smallest 300 eigenvalues; thus, the dimension p of the subspace is 300. The matrix L is a diagonal matrix whose diagonal components are sampled from random numbers uniformly distributed between 0 and 1. We choose an identity matrix as the basis matrix $B_m$ of the less-affected subspace of the message m, which is a 10×30 gray-valued image. For convenience, $B_m$ is chosen as an identity matrix; however, the following experiments demonstrate that the efficacy of the subspace approach can still be established. As we do not apply a transform to m, the feature-extraction function g of the message is simply a reshaping function that shapes an image to a vector; and $g^{-1}$ is the inverse reshape function that recovers the image from the vector. To demonstrate the efficacy of our approach, we consider three scenarios in which the functional style of information hiding can be applied. In the first scenario, we use the Lena image as the cover-text, and "SCC" as Alice's message, as shown in FIGS. 6A and 6B, respectively. Basic perceptually invariant operations with different parameters, such as JPEG compression, rotating, blurring, sharpening, shearing, and resizing, are applied to the Lena image. This yields a Lena database, containing 1,306 images. Via simulations, we measure the PSNRs (Peak Signal-to-Noise Ratios) of the errors between the extracted messages using images in the Lena database and the original message in FIG. 6B. We observe that the smallest PSNR value of the images is 64.5 dB; thus, we conclude that the secret message can be successfully extracted by using any image in the Lena database in the decoding stage.

Figure 7:
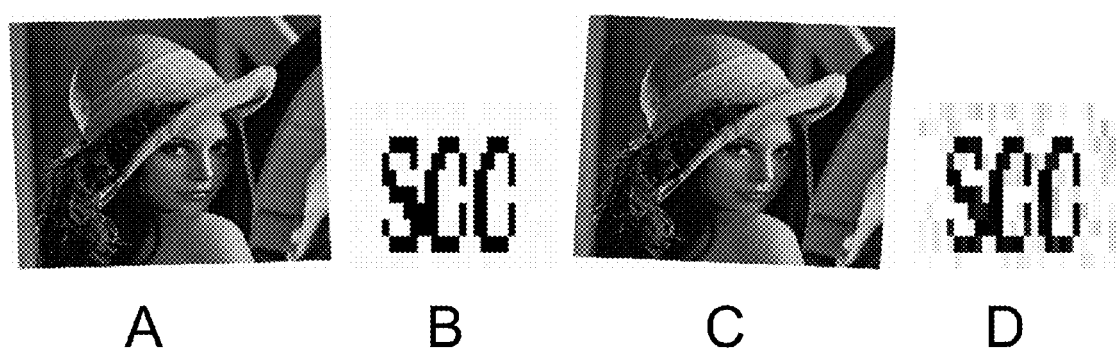
FIGS. 7A, 7C, and 7E are reference images
FIGS. 7B, 7D, and 7F are corresponding decoded message representations.
Figure 7:
Figure 8:
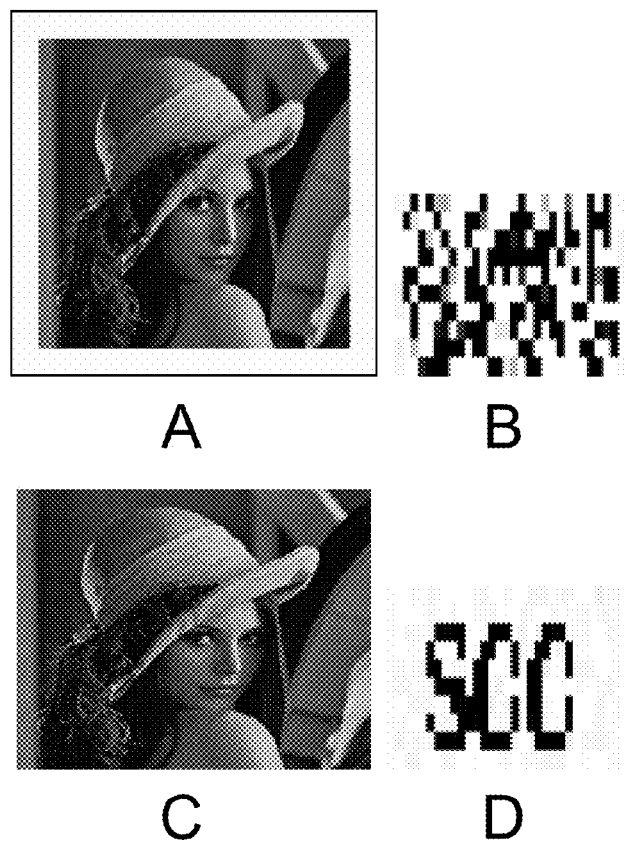
FIGS. 8A, and 8C are reference images
FIGS. 8B, and 8D are corresponding decoded message representations.

In addition to the PSNR, the visual representation of the extracted message is also important. Referring to FIGS. 7A-7F, we use the rotation of the Lena image as an example. The messages m in FIGS. 7B and 7D are clearly readable when the Lena image is rotated by small angles θ=+2° and θ=−3°, respectively, whereas the message image shown in FIG. 7F is noisy when the Lena image is rotated by a larger angle of θ=−4°. The message image gradually degrades as the angle of rotation increases. Referring to FIGS. 8A-D, the white frame in the image in FIG. 8A is caused by assigning the color white to the boundary pixels that are affected by clockwise and counterclockwise rotation at the same angle. The frame causes FIG. 8A to look different from the Lena image and makes message extraction difficult, as shown in FIG. 8B in which the message is illegible. After removing the frame and using the smaller image in FIG. 8C, we can read the message, as shown in FIG. 8D.

Figure 9:
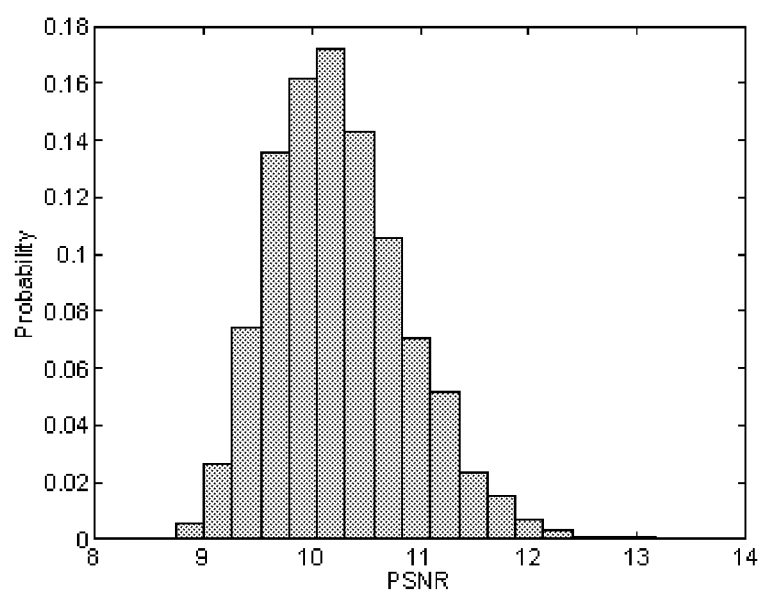
FIG. 9 is a distribution of Peak Signal-to-Noise Ratios (PSNRs) for a set of random images.

Finally, we randomly downloaded more than 2,000 images from the Internet, and extracted a message from each image. We measured the PSNR from the error of the extracted message and the original message and plotted the distribution of the PSNR, as shown in FIG. 9. The largest PSNR value in the distribution is less than 15 dB. The low dB value indicates that the likelihood of Alice's message being revealed by using a randomly selected image is extremely slim.

Figure 10A:
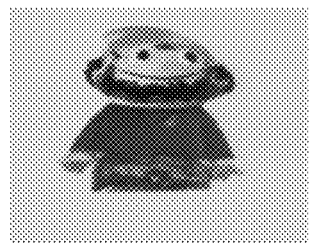
FIG. 10A is a shared image.

The next scenario is designed to show that Alice and Bob can exchange secret information by sharing a private database that no one else can access. If Alice wants to send a message to Bob, she uses the shared database and the message to create the keys. Then, Bob uses his database and keys to extract the message. In our simulation, the database shared by Alice and Bob is a sequence of 100 'dwarf' images, taken from different angles as the dwarf is rotated. FIG. 10A shows an image from the sequence. We use r to denote the percentage of images in the sequence that Alice uses to derive the keys. In this simulation, Alice's message is "SCC" and Bob uses all images in his database to retrieve the message. The PSNR distributions with different r values are plotted in FIGS. 9B, 9D, and 9F, while the messages with the smallest PSNR corresponding to different r values are shown in FIGS. 9C, 9E, and 9G. We observe that the message degrades smoothly as r decreases.

Figure 11:
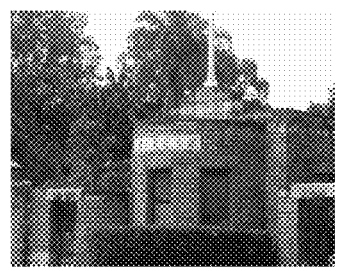
FIG. 11A is a reference image.
FIG. 11B is a decoded image representation of a message.
FIGS. 11C and 11D are PSNR distributions for two different databases of reference images.
Figure 11:
Figure 11:
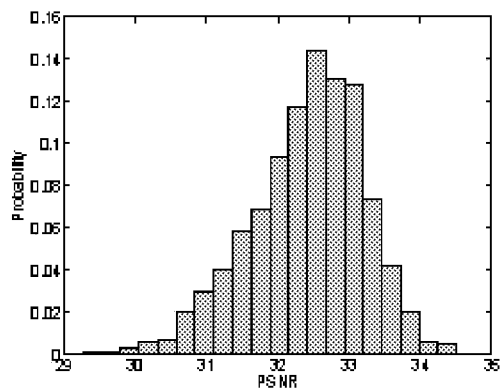
Figure 11:
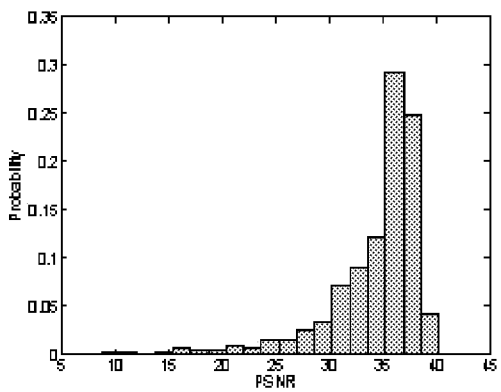
Figure 10:
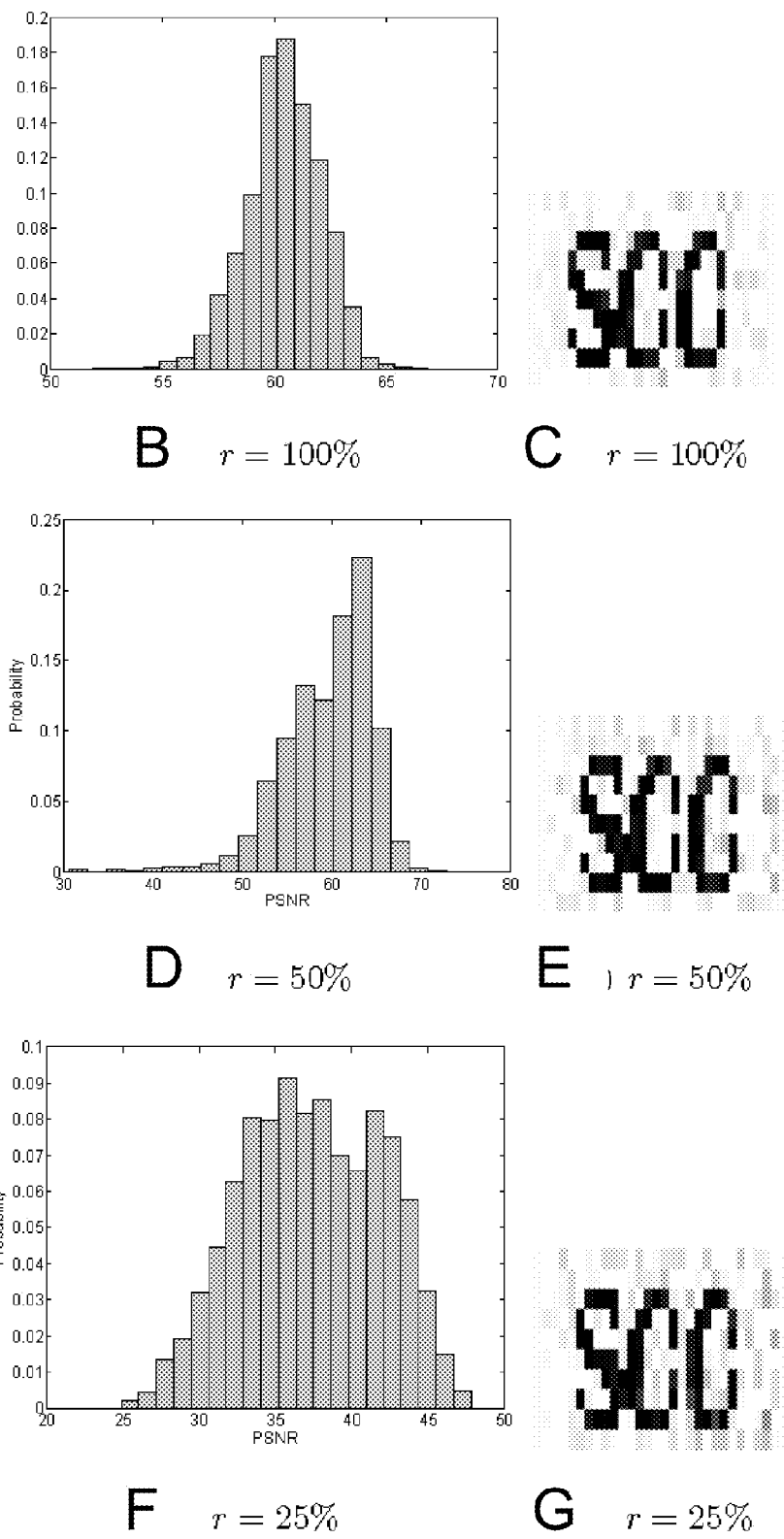
FIGS. 10B, 10D, and 10F are PSNR distributions.
FIGS. 10C, 10E, and 10G are corresponding extracted messages of the smallest PSNRs corresponding to different r values.

In the last scenario, Bob takes a picture with a digital camera and uses it to extract Alice's secret message. Thus, Alice and Bob have different databases. Alice takes several pictures of the main entrance of National Taiwan University from different angles. One of the images is shown in FIG. 11A. She uses the pictures and her message "MARRY ME" followed by a heart to derive the keys, which are then published. In addition, Alice gives Bob some hints about the location of the cover-text. The efficacy of applying the proposed approach in this scenario is analyzed via simulations. FIG. 11C shows the PSNR distribution of extracted images if Bob uses Alice's pictures. The smallest PSNR value is 35 dB, and the message image that generates that value is shown in FIG. 11B. If Bob uses his own pictures, a different PSNR distribution would be derived, as shown in FIG. 11D, where 5% of the messages recovered by Bob's images are illegible. It would appear that Bob can take many pictures and use an image enhancement method or a noise reduction method to obtain an even higher quality message.

5 Alternative Embodiments

In some examples, the encoder and decoder have user interfaces through which a user may provide or accept a message and/or information associated with reference images. For instance, a decoder may have a user interface on which a decoded message image is displayed. In some examples, the encoder and decoder have data interfaces through which data representing messages are received or transmitted, and/or have data interfaces for transmitting (storing) and receiving (reading) the hidden data.

Embodiments of this approach may be implemented in software, in hardware, or in a combination of hardware and software. Software may include instructions stored on a machine-readable medium for causing a data processing system to perform step used to implement approaches described above. The data processing system may include a general purpose processor and/or may make use of more specialized processors, for instance, Digital Signal Processors (DSPs), controllers, or custom instruction sequences.

It is to be understood that the foregoing description is intended to illustrate and not to limit the scope of the invention, which is defined by the scope of the appended claims. Other embodiments are within the scope of the following claims.

What is claimed is:

1. A method for communication hidden information comprising:
    accepting a first representation of a message;
    accepting a first image;
    generating decoding keys from the first representation of a message and the first image; and
    transmitting the decoding keys to a recipient;
    wherein the decoding keys are generated such that generating a second representation of the message from the transmitted decoding keys requires processing of a second image that is perceptually similar to the first image and independent of the message.

2. The method of claim 1, further comprising:
    receiving the decoding keys; and
    generating the second representation of the message from the decoding keys by processing the second image that is perceptually similar to the first image according to the decoding keys.

3. The method of claim 2, further comprising conveying information to the recipient identifying the second image.

4. The method of claim 2, further comprising obtaining the second image independently of the first image.

5. The method of claim 1, wherein generating the decoding keys comprises:
    generating a first decoding key specifying a transformation function for application to the first image and to the second image; and
    generating a second decoding key representing a difference between the first representation of the message and an application of the transformation function to the first image.

6. The method of claim 5, further comprising:
    generating a second representation of the message from the decoding keys by applying the transformation function specified by the first decoding key to the second image that is perceptually similar to the first image and using the second decoding key in combination with a result of applying the transformation function to yield the second representation of the message.

7. The method of claim 1, wherein generating the decoding keys comprises:
    determining characteristics of the first image across a plurality of transformations of the first image, wherein the transformations are selected such that each transformation applied to the first image creates a transformed image that is perceptually similar to the first image; and
    creating the decoding keys from the first representation of the message and the determined characteristics of the first image.

8. The method of claim 7, wherein determining the characteristics of the first image comprises identifying a subspace of a feature space of a feature transformation applied to the image.

9. The method of claim 8 wherein the identified subspace of the feature space exhibits relatively less variability over the plurality of transformations of the first image than the complement of the subspace.

10. The method of claim 1, wherein generating the decoding keys comprises:
    applying a set of transformations to the first image to produce a set of transformed image, and calculating a first feature representation of each of the transformed images;
    applying a set of transformations to the representation of the first message to produce a set of transformed messages, and calculating a second feature representation of each of the transformed messages;
    determining a transformation from a first feature representation of an image to a second feature representation of a message; and
    forming the decoding keys according to the first image, the representation of the first message, and determined transformation.

11. The method of claim 1, wherein generating the decoding keys comprises forming a plurality of transformations of the first image, each transformation being substantially perceptually similar to the first image.

12. The method of claim 11, wherein the first representation of the message comprises an image and generating the decoding keys further comprises forming a plurality of transformations of said image, each transformation being substantially perceptually similar to said image.

13. The method of claim 1, wherein the second representation of the message comprises an image.

14. The method of claim 1, wherein the second representation of the message comprises an audio signal.

15. The method of claim 1, wherein the second representation of the message comprises a video signal.

16. The method of claim 1, wherein the first image is selected independently of the message.

17. A method for decoding hidden information comprising:
    receiving decoding keys, the decoding keys including a first decoding key specifying a transformation function for application to an image and a second decoding key representing a difference between a first representation of the message and an application of the transformation function to a first image;
    obtaining a second image that is perceptually similar to the first image; and
    forming a second representation of the message from the decoding keys by applying the transformation function specified by the first decoding key to the second image and using the second decoding key in combination with a result of applying the transformation function to yield the second representation of the message.

18. A system for concealing a message, the system comprising:
    an encoder including an input interface for accepting a first representation of a message, the encoder including
        a first analyzer for processing a first image,
        a second analyzer for processing a representation of a message accepted through the interface,
        a module for combining the output of the first analyzer and the output of the second analyzer to form decoding keys for transmission to a recipient, such that generating a second representation of the message requires processing of a second image that is perceptually similar to the first image without requiring that the second image depends on the message, and an output interface to transmit the decoding keys to the recipient.

19. The system of claim 18 further comprising:

a decoder communicatively coupled to the encoder, the decoder including an input interface for receiving the message data decoding keys, and a image analysis module for forming an analysis of the second reference image, wherein the decoder further includes a module for combining the analysis of the second reference image and the decoding keys to form a second representation of the message, and an output interface for providing the second representation of the message.

20. The system of claim 19, wherein the encoder is configured such that when the second image is perceptually similar to the first image, the second representation of the message is perceptually similar to the first representation of the message.

* * * * *